(12) United States Patent
Luongo

(10) Patent No.: US 8,950,153 B2
(45) Date of Patent: Feb. 10, 2015

(54) SNAP-ON WIREGUIDE FOR DROP CEILING

(71) Applicant: Domenick Luongo, Bricktown, NJ (US)

(72) Inventor: Domenick Luongo, Bricktown, NJ (US)

( * ) Notice: Subject to any disclaimer, the term of this patent is extended or adjusted under 35 U.S.C. 154(b) by 0 days.

(21) Appl. No.: 13/861,113

(22) Filed: Apr. 11, 2013

(65) Prior Publication Data

US 2013/0269282 A1    Oct. 17, 2013

Related U.S. Application Data

(60) Provisional application No. 61/622,770, filed on Apr. 11, 2012.

(51) Int. Cl.
| | |
|---|---|
| *E04C 2/52* | (2006.01) |
| *E04F 13/22* | (2006.01) |
| *H02G 3/04* | (2006.01) |
| *H02G 3/38* | (2006.01) |
| *E04B 9/00* | (2006.01) |

(52) U.S. Cl.
CPC .............. *E04F 13/22* (2013.01); *H02G 3/0406* (2013.01); *H02G 3/381* (2013.01); *E04B 9/006* (2013.01)

USPC ............................................ 52/712; 52/220.6

(58) Field of Classification Search
USPC ............ 52/220.1, 220.3, 220.6, 220.7, 287.1, 52/506.07, 631, 712, 712.03; 242/615, 242/615.4, 548, 566
See application file for complete search history.

(56) References Cited

U.S. PATENT DOCUMENTS

| | | | | |
|---|---|---|---|---|
| 3,329,387 | A  * | 7/1967 | Fischer ......................... | 248/342 |
| 7,569,775 | B2 * | 8/2009 | Makwinski et al. .......... | 174/481 |
| 7,696,434 | B2 * | 4/2010 | Ruddick ...................... | 174/68.3 |

* cited by examiner

*Primary Examiner* — Charles A Fox
*Assistant Examiner* — Patrick Maestri
(74) *Attorney, Agent, or Firm* — The Farrell Law Firm, P.C.

(57) ABSTRACT

A wireguide configured to couple to a T-bar structure of a drop ceiling and method for installing the wireguide is provided. The wireguide includes a first portion contacting a base of the T-bar structure; a second portion extending from the first portion over a top member of the T-bar structure; and a third portion extending from the second portion to the base of the T-bar structure.

13 Claims, 3 Drawing Sheets

SNAP-ON WIREGUIDE FOR DROP CEILING

PRIORITY

This application claims priority under 35 U.S.C. §119(e) to U.S. Provisional Application Ser. No. 61/622,770, which was filed on Apr. 11, 2012, the entire content of which is incorporated herein by reference.

BACKGROUND OF THE INVENTION

1. Field of the Invention

The present invention generally relates to drop ceilings, and more particularly to a snap-on wireguide for a drop ceiling that prevents a cable or wire from becoming snagged or cut on the edges of a T-bar of a frame of the drop ceiling.

2. Description of the Related Art

A drop ceiling hangs below a main structural ceiling. The drop ceiling is typically suspended from the main ceiling by a grid of metal channels that are in the shape of an upside-down "T", and are known as "T-bars." The T-bars are typically suspended from the main ceiling by wires. The grid of T-bars is generally configured in a 2×2 foot square, known as a cell. It is also common for the grid to be configured in a 4×2 foot rectangle. A lightweight "panel" or "tile" is inserted into each cell. The drop ceiling conceals the main structural ceiling above, while allowing easy access to any lighting fixtures, wires, plumbing or ventilation ducts installed between the drop ceiling and the main structural ceiling.

The T-bars often have a rough or sharp top or side edge and wires can become snagged or entangled on the edges of the T-bars when running the wires across the drop ceiling. The sharp edges of the T-bar may also slice or nick the casing of the wire. Further, when an installer is running wires across the drop ceiling, the installer must use great effort to "snap" the wire upwards to un-snag the wire from the edges of the T-bar. This increases the installer's installation time and effort and may damage the wire, or the drop ceiling grid, during the installation process.

SUMMARY OF THE INVENTION

The present invention has been made to address at least the problems and disadvantages described above, and to provide at least the advantages described below. Accordingly, aspects of the present invention provide a snap-on wireguide for a drop ceiling that prevents a cable or wire from becoming snagged or cut on the edges of a T-bar of a frame of the drop ceiling.

According to an aspect of the present invention, a wireguide configured to couple to a T-bar structure of a drop ceiling is provided. The wireguide includes a first portion contacting a base of the T-bar structure; a second portion extending from the first portion over a top member of the T-bar structure; and a third portion extending from the second portion to the base of the T-bar structure.

According to another aspect of the present invention, a method of installing a cable above a drop ceiling is provided. The method includes removing a ceiling panel from a cell; inserting the cable through the cell; and passing the cable over a wireguide. The wireguide includes a first portion contacting a base of a T-bar structure of the drop ceiling; a second portion extending from the first portion over a top member of the T-bar structure; and a third portion extending from the second portion to the base of the T-bar structure.

According to an aspect of the present invention, a wireguide configured to couple to a T-bar structure of a drop ceiling is provided. The wireguide includes a first portion contacting a base of the T-bar structure; and a second portion extending from the first portion over a top member of the T-bar structure to the base of the T-bar structure.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Figure 1:
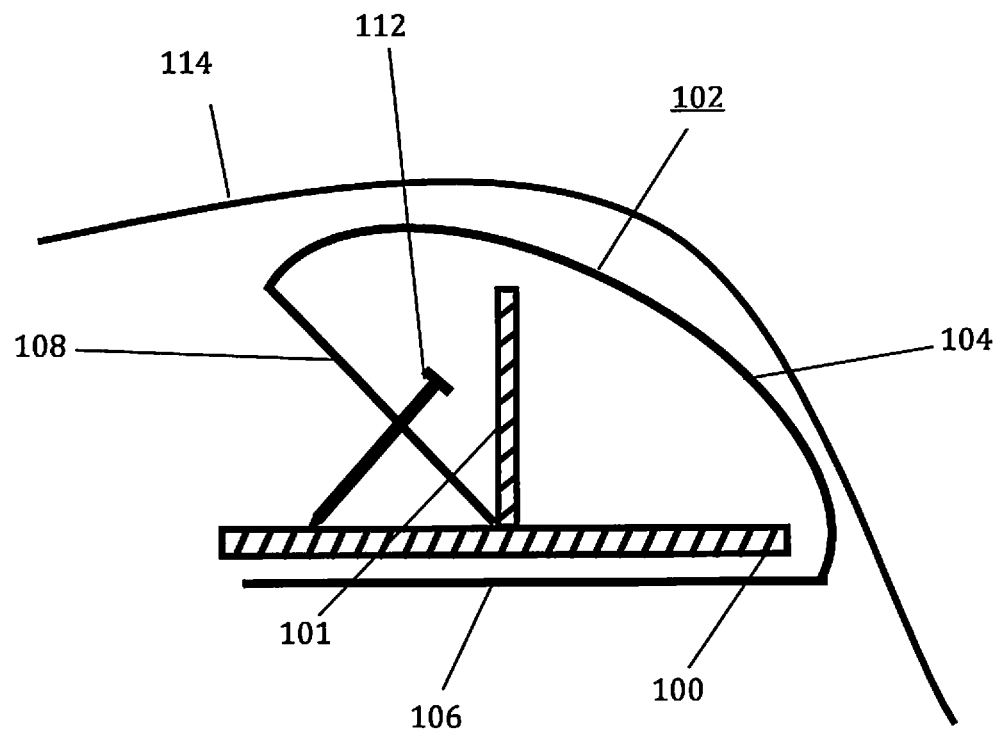
FIG. 1 illustrates a cross-sectional view of a snap-on wireguide according to an embodiment of the present invention.

Referring initially to FIG. 1, FIG. 1 illustrates a cross-sectional view of a snap-on wireguide snapped onto a T-bar of a drop ceiling according to an embodiment of the present invention. Specifically, the T-bar includes a T-bar base 100 and a T-bar top member 101. The T-bar top member 101 extends vertically from the T-bar base 100 and separates the tiles that make up the drop ceiling.

FIG. 1 also illustrates a wireguide 102 fitting over the top member 101 and wrapping around the T-bar base 100. Specifically, the wireguide 102 includes an arcuate top surface 104 extending along a convex arc from a base 106 around the top member 101. The top surface 104 may extend from the base 106 in any curved shape and is illustrated here in a side cross-section as a half-moon shape. The base 106 extends along the T-bar base 100 a distance sufficient to hold the wireguide 102 in place. A sidewall 108 maybe provided which extends from the top surface 104 hooking around the top member 101 at a point of the T-bar where the top member 101 joins the T-bar base 100. The sidewall 108 secures the wireguide 102 around the T-bar. With the base 106 and the sidewall 108 securing the wireguide 102 around the T-bar, a cable 114 can be pulled across the T-bar without snagging on the top member 101 causing damage to the cable 114 or the drop ceiling grid.

In another embodiment, the sidewall 108 can be eliminated, where the arcuate top surface 104 contacts the top edge of the top member 101 under pressure, so that the wireguide 102 snaps over the T-bar base 100 and the top member 101. In this embodiment, the base 106 may have an upturned edge to grip the T-bar base 100.

The wireguide 102 may also include a set screw 112 inserted through a screw hole (not shown) in the sidewall 108. The screw 112 provides additional means for securing the wireguide 102 to the T-bar, which may be necessary when the installer pulls a heavy cable, such as a BX cable, across the T-bar. The set screw 112 may also be provided at other locations of the wireguide 102, such as, for example, in the arcuate top surface 104 to secure the wireguide 102.

Figure 2:
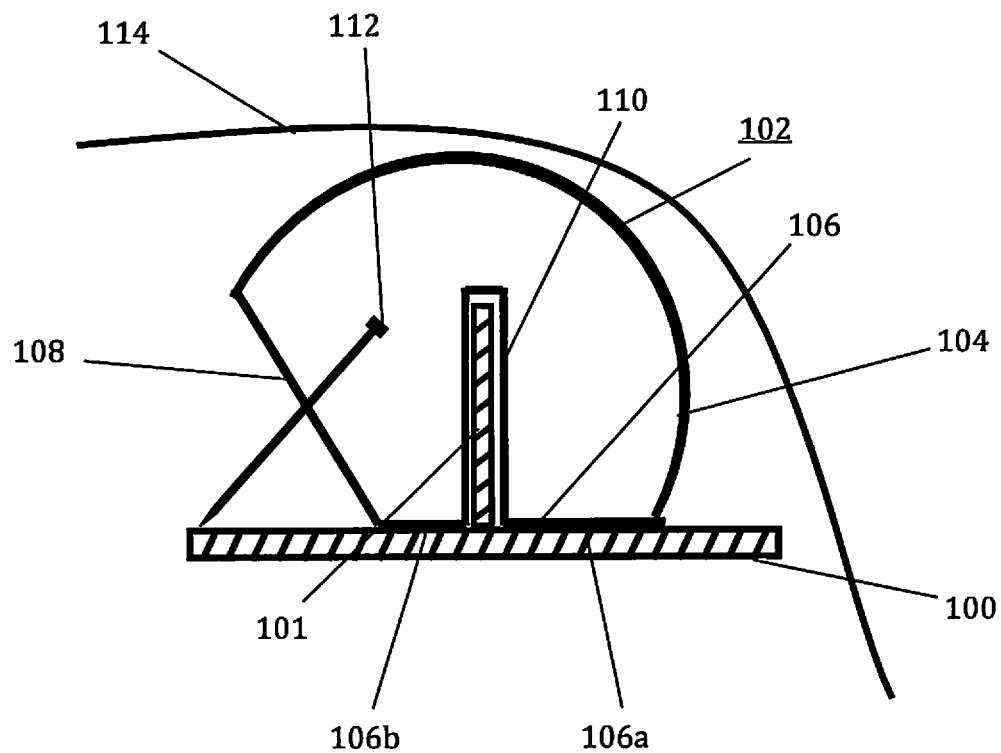
FIG. 2 illustrates a cross-sectional view a snap-on wireguide according to another embodiment of the present invention.

Referring now to FIG. 2, FIG. 2 illustrates a cross-sectional view of a snap-on wireguide including a base groove snapped on a T-bar of a drop ceiling according to an embodiment of the present invention. Specifically, the wireguide 102 is secured over the top member 101. The wireguide 102 includes the arcuate top surface 104 extending from the base 106, as described above. The sidewall 108 extends from the arcuate top surface 104 and may extend fully to join the top surface 104 to the base 106, or may extend partially to the base 106. Alternatively, the top surface 104 may extend in a full semicircle to extend from base 106a to base 106b.

As illustrated in FIG. 2, the base 106 may include a base groove 110 extending along a length of the wireguide 102. The base groove 110 fits over the top member 101 of the T-bar and snaps the wireguide 102 into place. With the wireguide 102 snapped over the top member 101 of the T-bar, an installer can run the cable 114 through an open cell of a drop ceiling where a ceiling panel has been removed. Specifically, an installer can insert the cable 114 through the cell of the drop ceiling and pull the cable 114 over the wireguide 102 across a room without snagging or damaging the cable 114 on the T-bar.

In use, the installer removes the ceiling panel (not shown) and installs the wireguide 102 by snapping it onto the T-bar base 100 and top member 101. Subsequently, the installer passes the cable 114 through the open cell and over the wireguide 102 (specifically, arcuate top surface 104) in a desired direction. Because the cable 114 does not contact the top member 101 of the T-bar, it is not snagged or damaged by the sharp edge of the top member 101.

Figure 3:
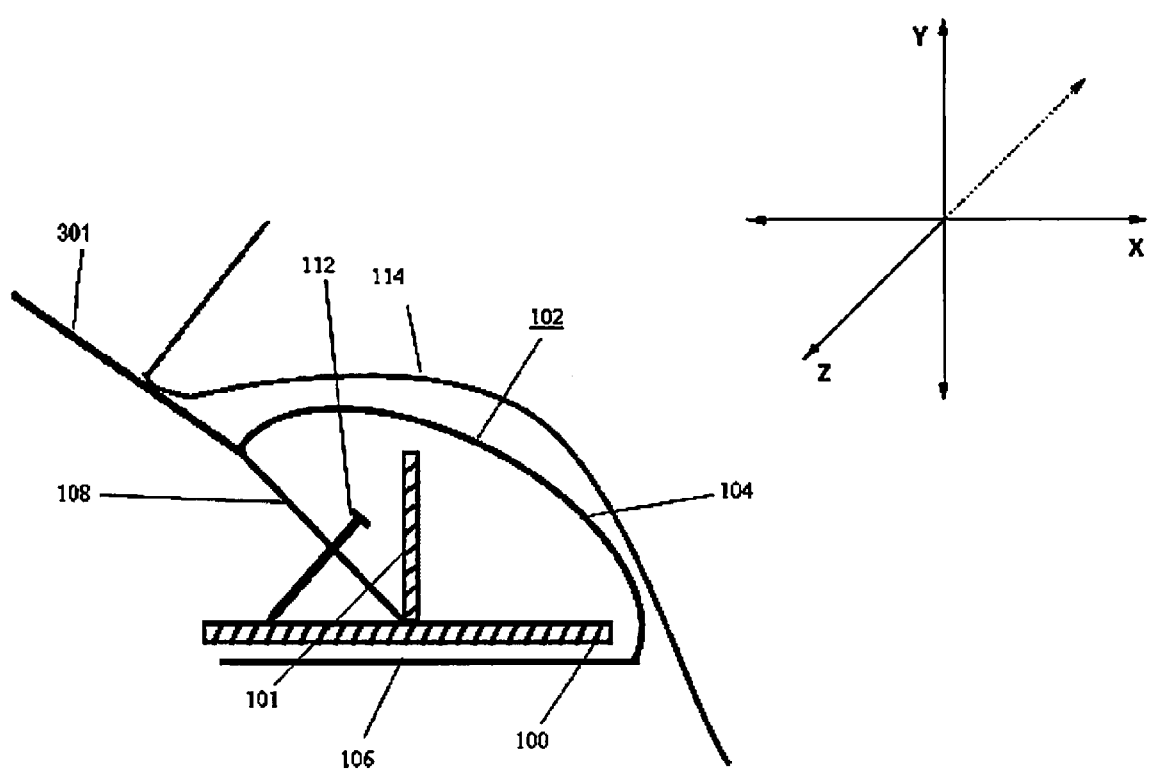
FIG. 3 illustrates a cross-sectional view of a snap-on wireguide according to a further embodiment of the present invention.

Referring to FIG. 3, the wireguide 102 is substantially similar to that of FIG. 1. A detailed description of the similar elements of the wireguide 102 of FIG. 3 will be omitted. In addition to the above-described elements of the wireguide 102, FIG. 3 illustrates an embodiment in which the wireguide 102 includes an additional wall 301. The additional wall allows the installer to change a direction of travel of the cable 114. For example, the cable may extend over the wireguide 102, as described above, and extend in a direction perpendicular to an original direction upon contacting the additional wall 301. Those of ordinary skill in the art will understand that the cable 114 may, upon contacting the additional wall 301, extend in any direction that is transverse to the original direction.

The wireguide 102 may also be used when pulling cable over bar joists that extend between I-beams of the structure of a building, as well as over the I-beams themselves, to avoid snagging and damaging the wires during installation.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A combination T-bar for a drop ceiling and a wireguide configured to couple to the T-bar structure, comprising:
   a T-bar for a drop ceiling;
   a first portion of the wireguide positionable along a base of the T-bar structure, wherein the first portion includes a base groove having a size and shape to receive a top member of the T-bar structure when the first portion is positioned along the base of the T-bar structure;
   a second portion of the wireguide extending from the first portion over the top member of the T-bar structure when the first portion is positioned along the base of the T-bar structure; and
   a third portion of the wireguide extending from the second portion to the base of the T-bar structure when the first portion is positioned along the base of the T-bar structure.

2. The combination of claim 1, wherein the second portion is curvedly shaped.

3. The combination of claim 2, wherein the second portion has a half-moon shape.

4. The combination of claim 2, wherein the second portion has semicircular shape.

5. The combination of claim 1, wherein the first portion extends beneath the base of the T-bar structure when the first portion is positioned along the base of the T-bar structure.

6. A combination T-bar for a drop ceiling and a wireguide configured to couple to the T-bar structure, comprising:
   a T-bar for a drop ceiling;
   a first portion of a wireguide positionable along a base of the T-bar structure;
   a second portion of a wireguide extending from the first portion over a top member of the T-bar structure when the first portion is positioned along the base of the T-bar structure; and
   a third portion of a wireguide extending from the second portion to the base of the T-bar structure and terminating at an intersection of the top member and the base of the T-bar structure when the first portion is positioned along the base of the T-bar structure.

7. The combination of claim 1, wherein the third portion terminates at an end of the first portion.

8. The combination of claim 1, wherein the third portion is configured to receive a screw to further secure the wireguide to the T-bar structure when the first portion is positioned along the base of the T-bar structure.

9. The combination of claim 1, further comprising:
   a fourth portion extending from an intersection of the second and third portions in a direction substantially opposite that of the third portion.

10. A method of installing a cable above a drop ceiling, comprising:
    removing a ceiling panel from a cell;
    inserting the cable through the cell; and
    passing the cable over a wireguide,
       wherein the wireguide includes:
          a first portion contacting a base of a T-bar structure of the drop ceiling; and
          a second portion extending from the first portion over a top member of the T-bar structure.

11. The method of claim 10, further comprising:
    a third portion extending from the second portion towards the base of the T-bar structure.

12. A combination T-bar for a drop ceiling and a wireguide configured to couple to the T-bar structure, comprising:
    a T-bar for a drop ceiling;
    a first portion of the wireguide positionable along a base of the T-bar structure, wherein the first portion includes a base groove having a size and shape to receive a top member of the T-bar structure when the first portion is positioned along the base of the T-bar structure; and
    a second portion of the wireguide extending from the first portion over the top member of the T-bar structure towards the base of the T-bar structure when the first portion is positioned along the base of the T-bar structure.

13. The combination of claim 12, wherein the first portion has an upturned edge to grip the base of the T-bar structure when the first portion is positioned along the base of the T-bar structure.

* * * * *